(12) United States Patent
Bowden et al.

(10) Patent No.: US 9,857,246 B2
(45) Date of Patent: Jan. 2, 2018

(54) SENSING SYSTEM INCLUDING A SENSING MEMBRANE

(71) Applicant: SENSABLE TECHNOLOGIES, LLC, Lindon, UT (US)

(72) Inventors: Anton E. Bowden, Lindon, UT (US); David T. Fullwood, Provo, UT (US); Daniel A. Baradoy, Provo, UT (US)

(73) Assignee: SENSABLE TECHNOLOGIES, LLC, Lindon, UT (US)

( * ) Notice: Subject to any disclaimer, the term of this patent is extended or adjusted under 35 U.S.C. 154(b) by 0 days.

(21) Appl. No.: 14/856,235

(22) Filed: Sep. 16, 2015

(65) Prior Publication Data
US 2016/0076954 A1 Mar. 17, 2016

Related U.S. Application Data

(60) Provisional application No. 62/051,925, filed on Sep. 17, 2014.

(51) Int. Cl.
G01L 1/18 (2006.01)

(52) U.S. Cl.
CPC ..................................... G01L 1/18 (2013.01)

(58) Field of Classification Search
CPC ........................................................ G01L 1/18
See application file for complete search history.

(56) References Cited

U.S. PATENT DOCUMENTS

| 3,321,592 | A | 5/1967 | Miller |
| 3,748,373 | A | 7/1973 | Remy |
| 3,794,790 | A | 2/1974 | Leyland |
| 4,060,705 | A | 11/1977 | Peachey |
| 4,172,216 | A | 10/1979 | O'Shea |
| 4,258,100 | A | 3/1981 | Fujitani et al. |
| 4,624,796 | A | 11/1986 | Giniewicz et al. |
| 4,762,970 | A | 8/1988 | Brinsley |
| 4,808,336 | A | 2/1989 | Rubner et al. |
| 4,951,985 | A | 8/1990 | Pong et al. |
| 5,060,527 | A | 10/1991 | Burgess |
| 5,132,583 | A | 7/1992 | Chang |
| 5,441,301 | A | 8/1995 | Breed et al. |
| 5,510,812 | A | 4/1996 | O'Mara et al. |

(Continued)

FOREIGN PATENT DOCUMENTS

| CN | 101669683 | 3/2010 |
| CN | 102144056 | 8/2011 |

(Continued)

OTHER PUBLICATIONS

Alonso et al., "Short-Fiber-Reinforced Epoxy Foams", Composites Part A: Applied Science and Manufacturing, vol. 37, 2006, pp. 1952-1960.

(Continued)

Primary Examiner — Lisa Caputo
Assistant Examiner — Tran M Tran
(74) Attorney, Agent, or Firm — Dorsey & Whitney LLP

(57) ABSTRACT

In one general aspect, an apparatus can include a sensing membrane including a plurality of conductive fillers included in a matrix. The apparatus can include a plurality of electrical leads coupled to an outer portion of the sensing membrane where the conductive fillers have a volumetric percentage of less than 25% of the volume of the sensing membrane.

18 Claims, 6 Drawing Sheets

(56) References Cited

U.S. PATENT DOCUMENTS

| | | |
|---|---|---|
| 5,540,996 A | 7/1996 | Tanzilli et al. |
| 5,568,659 A | 10/1996 | Fogel |
| 5,637,389 A | 6/1997 | Bryant et al. |
| 5,695,859 A | 12/1997 | Burgess |
| 5,702,629 A | 12/1997 | Cui et al. |
| 5,775,715 A | 7/1998 | Vandergrift |
| 5,856,644 A | 1/1999 | Burgess |
| 5,951,908 A | 9/1999 | Cui et al. |
| 6,121,869 A | 9/2000 | Burgess |
| 6,126,874 A | 10/2000 | Dillon et al. |
| 6,485,432 B1 | 11/2002 | Stasz et al. |
| 6,529,122 B1 | 3/2003 | Magnussen et al. |
| 6,534,430 B2 | 3/2003 | Makino et al. |
| 6,724,195 B2 | 4/2004 | Lurtz |
| 6,780,505 B1 | 8/2004 | Klett et al. |
| 6,925,851 B2 | 8/2005 | Reinbold et al. |
| 7,059,028 B2 | 6/2006 | Lammer |
| 7,147,214 B2 | 12/2006 | Klett et al. |
| 7,443,082 B2 | 10/2008 | Grumm |
| 7,479,878 B2 | 1/2009 | Maki et al. |
| 7,509,835 B2 | 3/2009 | Beck |
| 7,854,173 B2 * | 12/2010 | Cheng ............... G01B 7/18 73/760 |
| 7,935,415 B1 * | 5/2011 | Hansen ............... B29C 70/14 428/292.1 |
| 7,947,773 B2 * | 5/2011 | Hansen ............... B29C 70/14 264/104 |
| 7,997,125 B2 | 8/2011 | Kaya et al. |
| 8,210,994 B2 | 7/2012 | Chang et al. |
| 8,305,358 B2 * | 11/2012 | Klinghult ............ G06F 3/0414 178/18.05 |
| 8,361,608 B1 * | 1/2013 | Hansen ............... B29C 70/882 428/294.4 |
| 8,371,174 B2 | 2/2013 | Chen et al. |
| 8,544,337 B2 | 10/2013 | Kuczynski et al. |
| 8,631,703 B2 * | 1/2014 | Nagai ................. G01C 19/00 73/514.02 |
| 8,669,755 B2 * | 3/2014 | Kato .................. G01B 7/287 204/406 |
| 8,758,892 B2 | 6/2014 | Bergin et al. |
| 8,850,897 B2 * | 10/2014 | Eichhorn ............. B82Y 15/00 73/774 |
| 8,984,954 B2 * | 3/2015 | Merrell .............. G01L 1/16 73/774 |
| 9,044,593 B2 * | 6/2015 | Li ..................... A61N 1/0563 |
| 9,099,224 B2 * | 8/2015 | Choi .................. G01L 1/20 |
| 2006/0260058 A1 | 11/2006 | Schmidt |
| 2006/0272429 A1 | 12/2006 | Ganapathi et al. |
| 2007/0056081 A1 | 3/2007 | Aspray |
| 2007/0084293 A1 | 4/2007 | Kaiserman et al. |
| 2008/0066564 A1 | 3/2008 | Hayakawa et al. |
| 2008/0067618 A1 | 3/2008 | Wang et al. |
| 2008/0067619 A1 | 3/2008 | Farahani et al. |
| 2008/0195187 A1 | 8/2008 | Li et al. |
| 2008/0277631 A1 | 11/2008 | Smela et al. |
| 2009/0165569 A1 | 7/2009 | Taya et al. |
| 2009/0288259 A1 | 11/2009 | Lean et al. |
| 2010/0014556 A1 | 1/2010 | Huynh et al. |
| 2010/0126273 A1 * | 5/2010 | Lim .................. G01P 15/04 73/514.16 |
| 2010/0271174 A1 | 10/2010 | Kaminska et al. |
| 2011/0192564 A1 | 8/2011 | Mommer et al. |
| 2011/0226066 A1 | 9/2011 | Anand et al. |
| 2011/0265973 A1 | 11/2011 | Scalia |
| 2012/0048528 A1 | 3/2012 | Bergin et al. |
| 2012/0055257 A1 | 3/2012 | Shaw-Klein |
| 2012/0082950 A1 | 4/2012 | Li et al. |
| 2012/0193572 A1 | 8/2012 | MacKay |
| 2013/0074248 A1 | 3/2013 | Evans et al. |
| 2013/0079693 A1 | 3/2013 | Ranky et al. |
| 2013/0224458 A1 | 8/2013 | Bolliou |
| 2014/0039082 A1 | 2/2014 | Peterson et al. |
| 2014/0182063 A1 | 7/2014 | Crawford et al. |
| 2014/0183403 A1 | 7/2014 | Peterson et al. |
| 2014/0260653 A1 | 9/2014 | Merrell et al. |
| 2014/0338458 A1 | 11/2014 | Wang et al. |
| 2015/0177079 A1 * | 6/2015 | Eichhorn ............. G01L 9/0054 73/774 |
| 2015/0283353 A1 | 10/2015 | Kohn et al. |
| 2016/0163959 A1 | 6/2016 | Merrell et al. |
| 2017/0077838 A1 | 3/2017 | Wang et al. |

FOREIGN PATENT DOCUMENTS

| | | |
|---|---|---|
| EP | 0522882 A2 | 1/1993 |
| EP | 1265825 A2 | 12/2002 |
| EP | 2277691 A1 | 1/2011 |
| EP | 2078477 B1 | 7/2011 |
| EP | 2608287 A1 | 6/2013 |
| EP | 2973766 A1 | 1/2016 |
| JP | 2002340700 A | 11/2002 |
| JP | 2003282983 A | 10/2003 |
| JP | 2007533109 A | 11/2007 |
| JP | 2009139329 A | 6/2009 |
| KR | 1020100122002 A | 11/2010 |
| KR | 1020120099938 A | 9/2012 |
| WO | 89/10166 A1 | 11/1989 |
| WO | 0013582 A1 | 3/2000 |
| WO | 2004/070336 A1 | 8/2004 |
| WO | 2005117030 A9 | 1/2006 |
| WO | 2006132463 A1 | 12/2006 |
| WO | 2010131820 A1 | 11/2010 |
| WO | 2012/035350 A1 | 3/2012 |
| WO | 2012098840 A1 | 7/2012 |
| WO | 2013120398 A1 | 8/2013 |
| WO | 2014008250 A1 | 1/2014 |
| WO | 2014080429 A1 | 5/2014 |
| WO | 2014144532 A1 | 9/2014 |
| WO | 2016044633 A1 | 3/2016 |

OTHER PUBLICATIONS

Bonato, Paolo, "Wearable Sensors/Systems and Their Impact on Biomedical Engineering", IEEE Engineering in Medicine and Biology Magazine, May-Jun. 2003, pp. 18-20.

Cannata et al., "An Embedded Artificial Skin for Humanoid Robots", Proceedings of IEEE International Conference on Multisensor Fusion and Integration for Intelligent Systems, Aug. 2008, pp. 434-438.

Challagulla et al., "Electromechanical Response of Piezoelectric Foams", 18th International Conference on Composite Materials, vol. 60, No. 5, Mar. 2012, pp. 2111-2127.

Cheung et al., "A Novel Fluidic Strain Sensor for Large Strain Measurement", Sensors and Actuators A, vol. 147, 2008, pp. 401-408.

Flandin et al., "Effect of Strain on the Properties of an Ethylene-Octene Elastomer with Conductive Carbon Fillers", Journal of Applied Polymer Science, vol. 76, 2000, pp. 894-905.

Fleming et al., "In Vivo Measurement of Ligament/Tendon Strains and Forces: A Review", Annals of Biomedical Engineering, vol. 32, No. 3, Mar. 2004, pp. 318-328.

Fullwood et al., "Dispersion Metrics for Composites—A Machine Learning Based Analysis", Proceedings of SAMPE, May 6-9, 2013, 12 pages.

Hampshire et al., "Monitoring the Behavior of Steel Structures Using Distributed Optical Fiber Sensors", Journal of Constructional Steel Research, vol. 53, 2000, pp. 267-281.

Hyatt et al., "Nano-composite Sensors for Wide Range Measurement of Ligament Strain", Proceedings of the SEM Annual Conference, Society of Experimental Mechanics Series 17, Jun. 7-10, 2010, 4 pages.

Johnson et al., "Optimization of Nickel Nanocomposite for Large Strain Sensing Applications", Sensors and Actuators A, vol. 166, 2011, pp. 40-47.

Mahfuz et al., "Fabrication, synthesis and mechanical characterization of nanoparticles infused polyurethane foams", Composites Part A: Applied Science and Manufacturing, vol. 35, 2004, pp. 453-460.

(56) References Cited

OTHER PUBLICATIONS

Merrell et al., "Applications of Nano-Composite Piezoelectric Foam Sensors", Proceedings of ASME Conferenceon Smart Materials, Adaptive Structures and Intelligent Systems, Sep. 16-18, 2013, 5 pages.
Patel et al., "Longitudinal Monitoring of Patients with Parkinson's Disease via Wearable Sensor Technology in the Home Setting", 33rd Annual International Conference of the IEEE EMBS, Aug. 30-Sep. 3, 2011, pp. 1552-1555.
Remington et al., "Biomechanical Applications of Nano-Composite Strain Gauges", Brigham Young University, pp. 1-4.
Saha et al., "Effect of Nanoparticles on Mode-I Fracture Toughness of Polyurethane Foams", Polymer Composites, vol. 30, No. 8, Aug. 2009, pp. 1058-1064.
Shen et al., "Mechanical Characterization of Short Fiber Reinforced Phenolic Foam", Composites Part A: Applied Science and Manufacturing, vol. 34, 2003, pp. 899-906.
Sun et al., "Energy Absorption Capability of Nanocomposites: A Review", Composites Science and Technology, vol. 69, 2009, pp. 2392-2409.
Tao et al., "Gait Analysis Using Wearable Sensors", Sensors 2012, vol. 12, pp. 2255-2283.
Ventrelli et al., "Development of a stretchable skin-like tactile sensor based on polymeric composites", Proceedings of the 2009 IEEE International Conference on Robotics and Biomimetics, Dec. 19-23, 2009, pp. 123-128.
Watanabe et al., "Tests of Wireless Wearable Sensor System in Joint Angle Measurement of Lower Limbs", 33rd Annual International Conference of the IEEE EMBS, Aug. 30-Sep. 3, 2011, pp. 5469-5472.
Wegener, M., "Piezoelectric Polymer Foams: Transducer Mechanism and Preparation as well as Touch-Sensor and Ultrasonic-Transducer Properties", Proceedings of SPIE, vol. 79644, 9 pages.
Yao et al., "Wearable multifunctional sensors using printed stretchable conductors made of silver nanowires", © The Royal Society of Chemistry, Dec. 5, 2013, 8 pages.
Calkins et al., "Applications for a Nano-Composite High Displacement Strain Gauge", 9 pages, 2010.
Calkins et al., "Nanocomposite High Displacement Strain Gauges for use in Human-Machine Interfaces: Application in Hand Pose Determination", 2011, 97 pages.
Converse et al., "Quantification of Nickel Nanostrand Distributions within a Silicone Matrix using a FIB/SEM System", 2010, 15 pages.
Kanda, "High Strain Electrostrictive Polymers: Elaboration Methods and Modelization", Kanda; "High Strain Electrostrictive Polymers: Elaboration Methods and Modelization", May 25, 2012, 164 pages; URL:https://tel.archives-ouvertes.fr/tel-00701539/document.
Johnson et al. "Nanocomposite Large-Strain Sensor Optimization", 2009, 1 page.
Johnson et al., "Multiscale Model for the Extreme Piezoresistivity in Silicon/Nickel Nanostrand Nanocomposites", 2011, 11 pages.
Lindner et. al., "Dielectric barrier microdischarges: Mechanism for the charging of cellular piezoelectric polymers," Journal of Applied Physics , vol. 91, No. 8, Apr. 15, 2002, pp. 5283-5287.
Neugschwandtner et. al., "Large and broadband piezoelectricity in smart polymer-foam space-charge electrets," Applied Physics Letters , vol. 77, No. 23, Dec. 4, 2000, pp. 3827-3829.
Koecher, et al., Koecher et al.; "Characterization of Nickel Nanostrand Nanocomposites through Dielectric Spectroscopy and Nanoindentation"; Polymer Engineering & Science; Apr. 2, 2013; pp. 2666-2673.
Patel, "Ceramic Based Intelligent Piezoelectric Energy Harvesting Device", Patel; "Ceramic Based Intelligent Piezoelectric Energy Harvesting Device"; Ch. 8 of the book "Advances in Ceramics— Electric and Magnetic Ceramics, Bioceramics, Ceramics and Environement" published on Sep. 6, 2011; pp. 133-154.
International Search Report and Written Opinion Received for PCT/US2015/050758, dated Feb. 1, 2016, 10 Pages.
Johnson, et al., "The Colossal Piezoresistive Effect in Nickel Nanostrand Polymer Composites and a Quantum Tunneling Model," Tech Science Press, CMC, vol. 15, No. 2, pp. 87-111 (2010).
Johnson, Oliver K.., et al., "A Percolation/Quantum Tunneling Model for the Unique Behavior of Multifunctional Silicon/Nickel Nanostrand Nanocomposites," Society for the Advancement of Material and Process Engineering, 10 pages (2010).
Brady, Sarah, et al., "Inherently conducting polymer modified polyurethane smart foam for pressure sensing," Sensors and Actuators A: Physical 119.2, pp. 398-404 (2005).
Yang, Yonglai, et al., "Conductive carbon nanofiber-polymer foam structures," Advanced materials 17.16, pp. 1999-2003 (2005).
Yan, Ding-Xiang, et al.. "Electrical conductivity and major mechanical and thermal properties of carbon nanotube-filled polyurethane foams," Journal of applied polymer science 120.5, pp. 3014-3019 (2011).
Verdejo, Raquel, et al., "Physical properties of silicone foams filled with carbon nanotubes and functionalized graphene sheets," European Polymer Journal 44.9., pp. 2790-2797 (2008).
Verdejo, Raquel, et al., "Enhanced acoustic damping in flexible polyurethane foams filled with carbon nanotubes," Composites Science and Technology 69.10, pp. 1564-1569 (2009).
Zeng, Changchun, et al., "Synthesis and processing of PMMA carbon nanotube nanocomposite foams," Polymer 51.3, pp. 655-664 (2010).
Ibeh, Christopher C.., et al., "Current trends in nanocomposite foams," Journal of Cellular Plastics 44.6, pp. 493-515 (2008).
Dai, Kun, et al., "Electrical properties of an ultralight conductive carbon nanotube/polymer composite foam upon compression," Polymer-Plastics Technology and Engineering 51.3, pp. 304-306 (2012).
Ma, Hui-Ling, et al., "The effect of surface chemistry of graphene on cellular structures and electrical properties of polycarbonate nanocomposite foams," Industrial & Engineering Chemistry Research 53.12 pp. 4697-4703 (2014).
Rizvi, Reza, et al., "Characterization of a porous multifunctional nanocomposite for pressure sensing," ASME 2012 Conference on Smart Materials, Adaptive Structures and Intelligent Systems, American Society of Mechanical Engineers, Abstract (2012).
Chen, Limeng, et al., "Polymer nanocomposite foams," Journal of Materials Chemistry A 1.12 (Published online Dec. 18, 2012); pp. 3837-3850.
Wang, "Piezoelectric Nanogenerators for Self-Powered Nanosensors and Nanosystems", Wiley Encyclopedia of Electrical and Electronics Engineering, 2012, 20 pages.
Gerhard-Malthaupt, "Less can be More: Holes in Polymers lead to a new Paradigm of Piezoelectric Materials for Electret Transducers", IEEE transactions on Diaelectrics and Electrical Insulation, vol. 9 No. 5, pp. 850-859, Oct. 2002.

\* cited by examiner

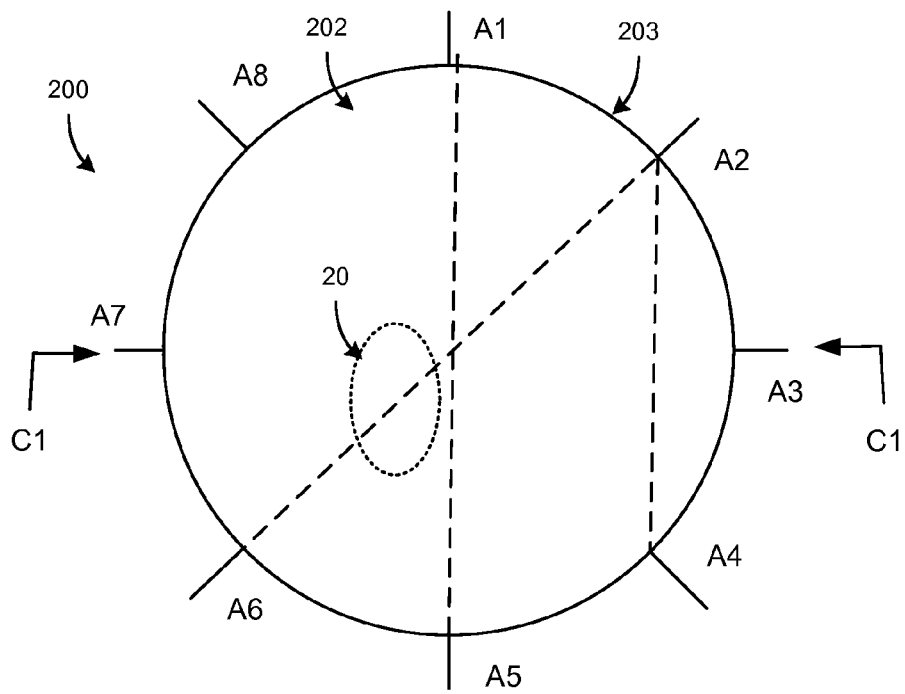
FIG. 2A
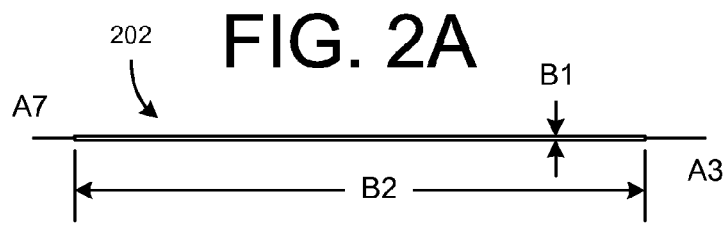
FIG. 2B
|    | A1 | A2 | A3 | A4 | A5  | A6  | A7  | A8  |
|----|----|----|----|----|-----|-----|-----|-----|
| A1 |    | 1  | 1  | 1  | 0.9 | 0.9 | 1   | 1   |
| A2 | 1  |    | 1  | 1  | 0.9 | 0.5 | 0.9 | 1   |
| A3 | 1  | 1  |    | 1  | 1   | 0.9 | 0.6 | 0.9 |
| A4 | 1  | 1  | 1  |    | 1   | 1   | 0.8 | 0.9 |
| A5 | 0.9| 0.9| 1  | 1  |     | 1   | 1   | 0.8 |
| A6 | 0.9| 0.5| 0.9| 1  | 1   |     | 1   | 1   |
| A7 | 1  | 0.9| 0.6| 0.8| 1   | 1   |     | 1   |
| A8 | 1  | 1  | 0.9| 0.9| 0.8 | 1   | 1   |     |
FIG. 2C

SENSING SYSTEM INCLUDING A SENSING MEMBRANE

RELATED APPLICATION

This patent application claims priority to and the benefit of U.S. Provisional Application No. 62/051,925 filed on Sep. 17, 2014.

FEDERALLY SPONSORED RESEARCH

This invention was made with government support under contract CMMI-1235365 awarded by the National Science Foundation. The government has certain rights in the invention.

TECHNICAL FIELD

This patent application is related to a sensing system including a sensing structure.

BACKGROUND

Strain and force sensors can provide vital information for many mechanics and dynamics applications. Most often, these quantities are measured using a piezoresponsive strain gauge. Piezoresponsive strain gauges are generally divided into two categories. Some strain gauges are piezoresistive, meaning that the electrical conductivity of the gauge changes during deformation. Such gauges require a current source, for example a battery, to operate. Other strain gauges are piezoelectric, meaning that the gauge generates electric potential, in the form of a voltage that can be measured, under strain. Existing strain gauges are limited in terms of the magnitude of strain they can measure and in their applications. Additionally, many such gauges are expensive, and difficult to calibrate, limiting the use of such gauges to laboratory settings.

SUMMARY

In one general aspect, an apparatus can include a sensing structure including a plurality of conductive fillers included in a matrix. The apparatus can include a plurality of electrical leads coupled to a portion of the sensing structure where the conductive fillers have a volumetric percentage of less than 25% of the volume of the sensing structure.

The details of one or more implementations are set forth in the accompanying drawings and the description below. Other features will be apparent from the description and drawings, and from the claims.

BRIEF DESCRIPTION OF THE DRAWINGS

FIGS. 2A and 2B are diagrams that illustrate a sensing membrane including leads and a membrane.

FIG. 2C illustrates a resistance map between pairs of leads from the leads in FIGS. 2A and 2B.

DETAILED DESCRIPTION

Figure 1:
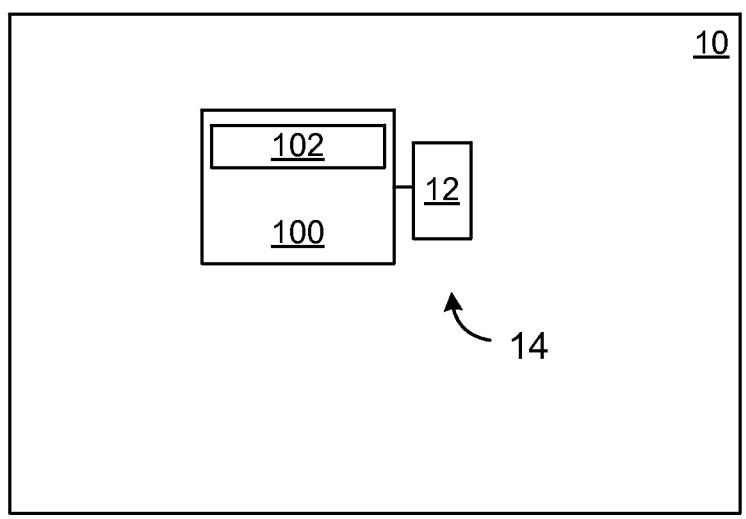
FIG. 1 is a diagram that illustrates a sensing structure coupled to an object.

FIG. 1 is a diagram that illustrates a sensing structure 100 (e.g., a sensing membrane, a sensing gauge, a sensing cylinder) coupled to (e.g., incorporated into, embedded within) an object 10 (or substrate). A computing device 12 is operatively coupled to the sensing structure 100. Although shown as being coupled to the object 10, the computing device 12 may be coupled to the sensing structure 100 and/or may be disposed outside of the object 10 (e.g., a fabric, a sheet, a plastic, a metal). The computing device 12 can be configured to process (e.g., collect, store, receive, transmit, produce, and/or so forth) data related to the sensing structure 100. In some implementations, the sensing structure 100 can be referred to as a sensing gauge or as a gauge.

The sensing structure 100 can be configured so that one or more locations of one or more deformations (e.g., strains, compressions) to the sensing structure 100 (also can be referred to as a strain sensing structure) can be determined (e.g., identified). The location(s) of the deformation(s) can be determined based on a static, an instantaneous, or changing electrical property (e.g., a piezoresistance, a piezoelectric property) between a series (e.g., a group, a set) of electrical leads (also can be referred to as contacts or as probes) 102 included in, or coupled to, the sensing structure 100. In some implementations, the sensing structure and computing device 12 can collectively be referred to as a sensing system 14. The sensing structure 100 can be different from a single strip of material used to test a resistance in one direction. In some implementations, the sensing structure 100 can be, or can include, multiple sensing structures that can be arranged in a variety of formations (e.g., can be stacked (e.g., stacked vertically) or disposed laterally (e.g., disposed laterally side by side)). More details related to the sensing structure 100 (and sensing system 14) are described in connection with at least FIG. 2A.

FIG. 2A is a diagram that illustrates a sensing membrane 200 including leads A1 through A8 (e.g., electrical leads) and a membrane 202. The sensing membrane 200 is an example of a type of sensing structure. In other words, the sensing structures illustrated and described in connection with FIGS. 2A through 2C can be a variation of at least the sensing structure 100 shown in FIG. 1.

As shown in FIG. 2A, the leads A1 through A8 are coupled to an outer portion (e.g., a perimeter) of the membrane 202. In some implementations, leads A1 through A8 can be coupled to different portions of the membrane 202 including an interior portion of the membrane 202. In some implementations, the sensing membrane 200 can include more or less leads than shown in FIG. 2A. In some implementations, the number of leads can be an even or odd number. In some implementations, the sensing membrane 200 can include leads that are spaced differently than shown in FIG. 2A. In some implementations, one or more of the leads A1 through A8 can be made of a conductive material. Although shown as having a circular profile in FIG. 2A, in some implementations, the membrane 202 can have a different shape such as a square shape, an irregular shape, and/or so forth.

In this example implementation, a location (e.g., a coordinate location, an X/Y location, etc.) of a deformation 20, which can be defined in response to a force or displacement applied to the membrane 202, can be identified using the leads A1 through A8. Changes (or instantaneous measurements) in electrical properties (e.g., a resistance) across or through the membrane 202 can be determined (e.g., detected, measured) via the leads A1 through A8 (or a subset thereof). Specifically, one or more changes in electrical properties can be determined using the leads A1 through A8 (or a subset thereof). An example is illustrated in conjunction with the table shown in FIG. 2C.

FIG. 2C illustrates a resistance map between pairs of leads from the leads A1 through A8 shown in FIG. 2A. The resistance values are normalized to 1 (which is the resistance without a deformation) in this example implementation. The resistance values can be determined by inducing a voltage (e.g., by injecting a current) between pairs of the leads A1 through A8 using a device (e.g., computing device 12 shown in FIG. 1). For example, a resistance value of 0.5 is determined (e.g., detected, measured) between lead A2 and lead A6, which intersects (as represented by a dashed line) the deformation 20 shown in FIG. 2A. In contrast, a slightly higher resistance value of 0.9 is determined between lead A2 and lead A5, which is close to (e.g., adjacent to), but tangential to the deformation 20. As yet another example, no change in resistance (as represented by a resistance value of 1) is determined between lead A2 and lead A4. Accordingly, via combinations of resistance measurements between the leads A1 through A8 the location of the deformation 20 can be determined (e.g., using computing device 12 shown in FIG. 1). In other words, the location, size, shape (or profile) and/or other characteristics (e.g., deformation type) of the deformation 20 can be mapped at least in two-dimensions (or more dimensions) using the resistance values. Although FIG. 2C illustrates a resistance map, a similar mapping can be defined using a different electrical property.

In some implementations, the leads A1 through A8 can be used in a variety of ways to identify deformations. For example, in some implementations one or more of the leads A1 through A8 can be used as a ground or as a reference and other of the leads A1 through A8 can be used to measure a signal. As a specific example, lead A1 can be used a reference lead and signals from the other leads A2 through A8 can be measured with reference to lead A1. In some implementations, such a pattern can be used during a first measurement cycle and a different reference lead can be used during a second measurement cycle. In some implementations, a first lead can be used as a first reference for a first set of leads and a second lead can be used as a second reference for a second set of leads (which can intersect with or can be an orthogonal set relative to the first set of leads).

Referring back to FIG. 2A, the leads A1 through A8 in this implementation are coupled to an outer portion 203 of the membrane 202. Accordingly, measurements of electrical properties are end-to-end resistance measurements between one point (e.g., a first point) on the outer portion 203 of the membrane 202 to one or more additional points (e.g., at least a second point) on the outer portion 203 of the membrane 202. In some implementations, one or more leads may be coupled to an interior portion (e.g., a middle portion, may have a conductive portion that may be disposed in the interior portion) of the membrane 202. Accordingly, electrical properties can be between interior locations (points) of the membrane 202 or between an interior location (or point) and a outer portion location of the membrane 202. In some implementations, different levels (e.g., different set distances, different groupings, different radial distances) of leads can be included in a membrane 202. In some implementations, one or more leads can be include on a top portion or a bottom portion (rather than a side portion) of the membrane 202.

Referring back to FIG. 1, the sensing structure 100 (e.g., a membrane) can be made of a variety of materials. For example, the sensing structure 100 can include various combinations of nanocomposite filler materials for use with different types of silicones or other polymers.

The sensing structure 100 can be a composite material that exhibits a piezoelectric response and/or a negative piezoresistive effect to compression and relaxation (e.g., the sensing structure can have a negative correlation between strain and electrical resistance), according to one implementation. A piezoresistive strain gauge (or structure) that exhibit a positive correlation between strain and electrical resistance (e.g., the resistance increases as the gauge becomes longer) may have a relatively high power requirement. The sensing structure 100 can also exhibit a piezoelectric response and/or piezoresistivity in response to tensile or compressive strain. The sensing structure 100 may include several components: a matrix with one or more of conductive fillers (e.g., conductive nanoparticles, conductive stabilizers). In some implementations, the combination of the matrix and the one or more conductive fillers may be relatively void free or may substantially exclude voids (also can be referred to as being without voids or voidless). In other words, the voids can be less than 5% by volume (e.g., less than 1%) of the material (e.g., composite material) of the sensing structure 100. Accordingly, a voidless composite material can have less than 5% by volume voids. In some implementations, non-conductive fillers can also be included in the matrix described above.

The sensing structure 100 may include several components: a matrix with one or more of conductive fillers (e.g., conductive nanoparticles, conductive stabilizers), and voids. In some implementations, the voids and conductive fillers may be uniformly dispersed throughout the matrix. In some implementations, the matrix may be any polymer (e.g., an elastomeric polymer, a thermoplastic polymer, a thermoset polymer, etc.), such as a silicone-based material, a polyurethane material, other foam-like material, etc., that retains its shape after deformation and includes voids throughout the material. In other words, the matrix can have an elasticity, porosity, and high failure strain, typically from 50% to 1000% strain.

In some implementations, the polymer matrix may be a foam-based product that forms voids, for example through a chemical reaction, introduction of a foaming agent, through gas injection, etc. The voids may give the composite material relatively low weight, relatively low density, and relatively high energy absorption. In other words, unlike a solid material, in composite material the voids are dispersed throughout the matrix. For example, the density of the polymer used for matrix may be approximately two to three-and-a-half times greater without the voids than with the voids. For example, in some implementations the sensing structure 100 may have a density from 350 kg/m$^3$ to 800 kg/m$^3$.

In some implementations, the polymer used as the matrix may be capable of being mixed with conductive fillers prior to curing. For example, some polymers may be thermoset, or irreversibly cured via heat, a chemical reaction, or irradiation. Prior to curing, conductive fillers may be combined with the uncured polymer. For example, a polymer cured via a chemical reaction, such as foam, may include two parts, the polymer being formed when the two parts are mixed or combined. Once combined, the two parts chemically react, generating the air pockets or voids characteristic of foam, and harden. Conductive fillers may be mixed with one or both parts prior to combining. Some polymers may be mixed with a foaming agent prior to curing. Such polymers may be combined with conductive fillers prior to mixing with the foaming agent. Voids may be formed in the polymer by gas injection, by whipping, etc. Some polymers may be cured via heat. Thermoset polymers may be cast, molded, sprayed or extruded after mixing and before they cure. The sensing structure can include any of the composite materials (e.g., voided composite materials) described in U.S. patent application Ser. No. 14/266,438, which is incorporated by reference herein.

In some implementations, the conductive filler may include conductive nanoparticles. In some implementations, conductive nanoparticles are particles with at least one dimension that measures 1000 nanometers (nm) or less (e.g., 100 nm) and that also made from a material that conducts electricity. Examples of such conductive materials include nickel, platinum, gold, silver, copper, etc. Examples of conductive nanoparticles include nanowires, powders, and nanostrands. One type of nanostrand that can be included is a nickel nanostrand (NiN).

The conductive filler may also include a plurality of conductive stabilizers. The conductive stabilizers may also be added to the uncured polymer prior to formation of the voids. The conductive stabilizers may be any conductive material that acts as a stabilizer. In one implementation, the conductive stabilizers may be fibers coated with a material that conducts electricity. For example, the conductive stabilizers may be carbon fibers coated with pure nickel. In some implementations, the fibers may be coated approximately 20-40% by weight with the conductive material. The fibers may be cut to short lengths, for example from 0.1 to 1 mm. The fibers may have a diameter of up to 10 μm (e.g., 0.2 μm, 1 μm, 5 μm, 8 μm). In some implementations, the fibers may be hollow (e.g., tubes). In some implementations, the fibers may be nickel-coated carbon nanotubes (CNTs) or nickel-coated carbon fibers (NCCFs), which are also available from Conductive Composites, LLC. The conductive stabilizers may increase the strength and energy absorption capabilities of the sensing structure 100. The conductive nanoparticles may also increase the strength and energy absorption capabilities of the sensing structure 100, but typically to a lesser extent than the conductive stabilizers. In some implementations, the conductive nanoparticles may be a primary conductive filler and the conductive stabilizers may be a secondary conductive filler.

Because the conductive fillers, for example conductive nanoparticles and/or the conductive stabilizers, are mixed with, and thus disposed throughout, the polymer matrix, the composite material is uniform. Put another way, the composite material, and thus the strain gauge, does not have layers and its composition is generally consistent at a macroscopic (e.g., naked eye) level from outer surface (outer wall) to outer surface. The sensing structure 100 may also have isotropic properties at a macroscopic level in that it does not exhibit a preferred directionality. In some implementations, the sensing structure 100 may have anisotropic properties at a macroscopic level that exhibit a preferred directionality.

Due to the inclusion of conductive fillers, such as conductive nanoparticles and/or conductive stabilizers, the sensing structure 100 can exhibit negative piezoresistivity and a piezoelectric response to an impact or other deformation applied along any axis, such as the x axis, the y axis, and the z axis.

In some implementations, the nanoparticles included in a composite material of the sensing structure 100 can be less than 25% (but greater than 0%) by volume (e.g., less than 20%, less than 15%, less than 10%, less than 5%, less than 2%) of the composite material. In particular this can be the case in an implementation of the composite material without voids or substantially without voids.

In some instances, the conductive filler (e.g., nanoparticles) being less than 25% by volume of the composite material can be critical to proper electrical property change or responsiveness (e.g., piezoresistive responsiveness (e.g., a decrease in resistance), an increase in conductivity) of the composite material. For example, conductive paths within the composite material can be modified (e.g., increased) resulting in higher conductivity or reduced resistance in response to a strain when the composite material has less than 25% by volume nanoparticles.

A non-limiting example of one potential mechanism that results in increased conductivity or a decrease in resistance in response to a strain is tunneling (e.g., quantum tunneling). Tunneling effects that result in piezoresistive responsiveness may be promoted by the relatively low volumetric composition of the nanoparticles within the composite material. Relatively small shifts (e.g., decreases) in distance between nanoparticles separated by a matrix material (which is generally insulative) can facilitate tunneling across the matrix material disposed between the nanoparticles. In other words, a decrease in a thickness of matrix material disposed between nanoparticles can facilitate or allow tunnel effects (and conduction) between the nanoparticles. In some implementations, the distances between nanoparticles can be on the order of a few nanometers or less (e.g., 1 nm, 5 nm, 10 nm). Before being strained, the composite material of the sensing structure 100 can be a relatively insulating material. In other words, the tunneling probability can be relatively low before being strained (which can result in a relatively resistive material property) and relatively high after being strained (which can result in a relatively conductive material property).

In contrast, if the volumetric percentage of the nanoparticles were too high (e.g., greater than 50%), then shifting in thickness of the matrix material and distance between nanoparticles may not result in a change (e.g., substantial change) in an electrical property (or decrease in resistance) of the composite material of the sensing structure 100. Specifically, a substantially conductive path may already be defined between nanoparticles in a composite material with a relatively high nanoparticle volumetric percentage, so a strain would not change (e.g., significantly or substantially change) a conductivity of the composite material.

In some implementations, the sensing structure 100 can be a relatively flat material. In other words, a thickness of the material can be relatively thin relative to a length and/or width of the material. A cross-sectional view (cut along C1 in FIG. 2A) illustrates the dimensions of the sensing membrane 200 in FIG. 2B.

As shown in FIG. 2B, a thickness B1 of the membrane 202 is relatively small compared with a length B2 (or a diameter) of the membrane 202. The thickness B1 of the membrane 202 (or any other sensing structure described herein) can be sufficiently thin relative to the length B2 such that Poisson effects that may adversely affect measurements may be avoided. Accordingly, measurements across the length (or width, or diameter) between leads A1 through A8 may be 2-dimensional measurements. As shown in FIG. 2B, the leads A3 and A7 are aligned along a plane (or surface (e.g., curved surface)) along which the length of the membrane 202 is aligned. In some implementations, a measurement axis through the membrane 202 can be aligned along a plane (or surface (e.g., curved surface)) along which the membrane 202 is aligned.

Figure 3A:
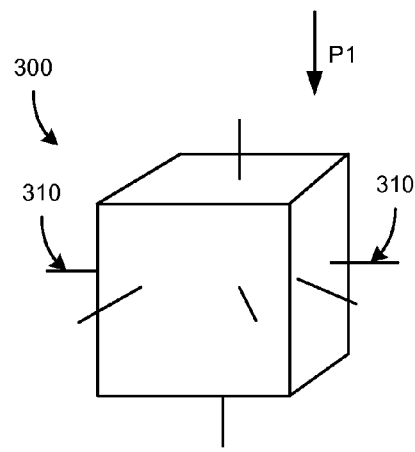
FIGS. 3A through 3C, illustrate a variety of the sensing structures according to implementations
Figure 3B:
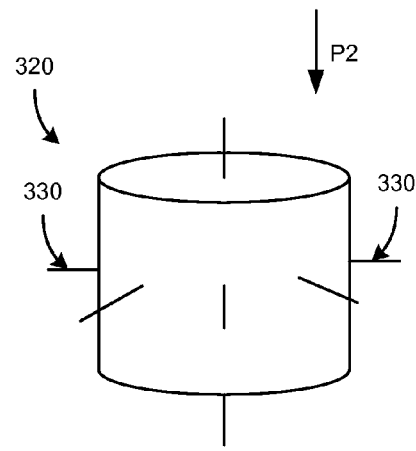
Figure 3C:
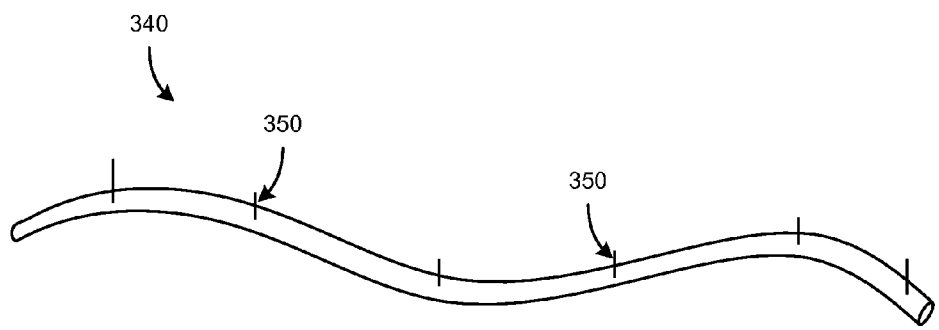

FIGS. 3A through 3C, illustrate a variety of the sensing structures according to implementations. Any of the features of the sensing structures described in connection with FIGS. 3A through 3C can be applied to the other sensing structures described herein (e.g., sensing membrane 200 described in connection with FIGS. 2A through 2C, sensing structure 100 described in connection with FIG. 1).

The sensing structures illustrated in FIGS. 3A through 3C are variations of at least the sensing structure 100 shown in FIG. 1. The sensing structures illustrated in FIGS. 3A through 3C can have any of the characteristics (e.g., compositions, etc.) described herein. For example, any of the sensing structures described herein can include a combination of a matrix (which can include a non-conductive filler) and a one or more conductive fillers that may be relatively void free or may substantially exclude voids. As another example, any of the sensing structures illustrated in FIGS. 3A through 3C can have one or more leads (also can be referred to as electrical leads) that can be used to identify (e.g., map) deformations (e.g., strain) within the structures (e.g., as described in connection with at least FIGS. 2A through 2C). In some implementations, one or more electrical leads can be included on one of more surfaces of a sensing structure. As a specific example, a single lead can be included on each of the surfaces of a sensing structure or on less than all of the surfaces of a sensing structure (e.g., on a single surface of the sensing structure).

Although FIGS. 3A through 3C illustrate a few example shapes of sensing structures. The sensing structures described herein can have other shapes or shaped portions (e.g., a spherical shape, an irregular shape, a tapered shape, a triangular shape, an oval shape). In some implementations, one or more of the shapes can be defined so that the sensing structure can be mechanically robust.

FIG. 3A illustrates a sensing structure 300 that has a box-like shape (e.g., a rectangular shape, a square shape). As illustrated in FIG. 3A, the sensing structure 300 includes leads 310 (only a few are labeled for convenience) on various surfaces of the sensing structure 300. In this implementation, a first of the leads 310 is disposed on a top surface of the sensing structure 300 and a second of the leads 310 is disposed on a bottom surface of the sensing structure 300. The remaining leads 310 are disposed on side surfaces of the sensing structure 300. In some implementations, leads 310 may not be disposed on, and/or more leads than shown can be disposed on, one or more of the top, bottom, or side surfaces.

In some implementations, at least some of the leads 310 can be aligned along a plane. For example, the leads 310 disposed on the side surfaces of the sensing structure 300 can be disposed within the plane. In some implementations, one or more of the leads 310 may not be aligned with any plane with other of the leads 310. For example, one or more the leads 310 may define a pattern, may be staggered at various locations (e.g., vertical locations), may have conductive portions disposed in an interior portion of the sensing structure 300, and/or so forth.

As with other examples of sensing structures described herein, the leads 310 can be used to identify a location of a deformation. In this implementation, the leads 310 can be used to identify an X-Y location (e.g., within an X-Y plane perpendicular to projection P1) of a deformation in response to the deformation on any surface of the sensing structure 300. For example, in response to a deformation (e.g., a strain, a compression) on a top surface if the sensing structure 300, the leads 310 can be used to identify an X-Y location of the deformation within an X-Y plane perpendicular to projection P1. If the deformation were on a side surface of the sensing structure 300, the X-Y location would be identified as being at an edge of the sensing structure 300 if viewed from the perspective of projection P1.

FIG. 3B illustrates another example of a sensing structure 320 that has a cylindrical shape. As illustrated in FIG. 3B, the sensing structure 320 includes leads 330 (only a few are labeled for convenience) on various surfaces of the sensing structure 320. In this implementation, a first of the leads 330 is disposed on a top surface of the sensing structure 320 and a second of the leads 330 is disposed on a bottom surface of the sensing structure 320. The remaining leads 330 are disposed around the side surface of the sensing structure 320. In some implementations, leads 330 may not be disposed on, and/or more leads than shown can be disposed on, one or more of the top, bottom, or side surfaces. As described in connection with FIG. 3A, in this implementation, the leads 330 can be used to identify an X-Y location (e.g., within an X-Y plane perpendicular to projection P2) of a deformation in response to the deformation on any surface of the sensing structure 320. In some implementations, the sensing structure 320 can have a shape modified from that shown in FIG. 3B (e.g., a height less than a diameter, a height greater than a diameter, tapered side walls, one or more notches, one or more flat portions, an oval shape, etc.).

FIG. 3C illustrates another example of a sensing structure 340 that has an elongate shape (e.g., a shape like a wire). In this implementation, the sensing structure 340 has a circular cross-sectional shape (or profile). In some implementations, the sensing structure 340 can have a different cross-sectional shape (e.g., a triangular cross-sectional shape, a square cross-sectional shape, an oval cross-sectional shape).

As illustrated in FIG. 3C, the sensing structure 340 includes leads 350 (only a few are labeled for convenience) on various surfaces of the sensing structure 350. In some implementations, leads 330 may not be disposed on, and/or more leads than shown can be disposed on, one or more of the top, bottom, or side surfaces. In this implementation, the leads 350 can be used to identify a deformation along the elongate shape in response to the deformation on any surface of the sensing structure 340. For example, a deformation between a pair of the leads 350 can be used to identify that the deformation has occurred between the pair leads 350. In other words, leads 350 can be used to identify deformations along segments between pairs of leads 350. In some implementations, the segments can be between adjacent pairs leads 350 (without an intervening lead) or between non-adjacent pairs leads 350. In some implementations, more than one lead (e.g., a pair of leads) can be located at a cross-section of the elongate shape of the sensing structure 340.

Referring back to FIG. 1, in some implementations, the computing device 12 can be, or can be configured to communicate with, for example, a wired device and/or a wireless device (e.g., wi-fi enabled device), a microcontroller, a computing entity (e.g., a personal computing device), a server device (e.g., a web server), a mobile phone, a touchscreen device, a personal digital assistant (PDA), a laptop, a television including, or associated with, one or more processors, a tablet device, e-reader, and/or so forth. The computing device 12 can be configured to operate based on one or more platforms (e.g., one or more similar or different platforms) that can include one or more types of hardware, software, firmware, operating systems, runtime libraries, and/or so forth. In some implementations, the components of the computing device 12 can be configured to operate within a cluster or network of devices (e.g., a server farm). In such an implementation, the functionality and processing of the components of the computing device 12 can be distributed to several devices of the cluster of devices.

Figure 4:
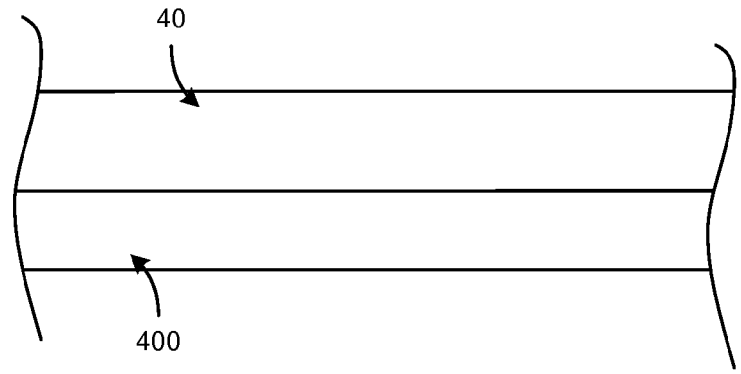
FIG. 4 is a diagram that illustrates a sensing structure coupled to a surface of an object.

FIG. 4 is a diagram that illustrates a sensing structure 400 (e.g., a sensing membrane, a sensing cylinder) coupled to a surface of an object 40. In some implementations, the sensing structure 400 has a thickness that is less than a thickness of the object 40. In some implementations, the thickness of the sensing structure 400 can be approximately the same as, or less than, the thickness of the object 40. In some implementations, coupling of the sensing structure 400 to the object 40 enables separation of electrical property measurements (e.g., electrical resistance measurements) of the sensing structure 400 from the mechanical stiffness of the sensing structure 400/object 40 (e.g., gauge/fabric) combination.

In some implementations, the sensing structure 400 can be embedded within an object such as object 40 (which can also be referred to as a substrate). In some implementations, multiple sensing structures can be coupled to any surface (e.g., coupled to a top surface and a bottom surface) of an object. In some implementations, sensing structure can be configured to cover multiple nonparallel surfaces of an object. In some implementations, multiple sensing structures can be coupled to a single surface. In some implementations, the object 40 can include, or can be part of, an electrical component (e.g., a haptic component component), a fabric, a metal, and/or so forth.

Figure 5A:
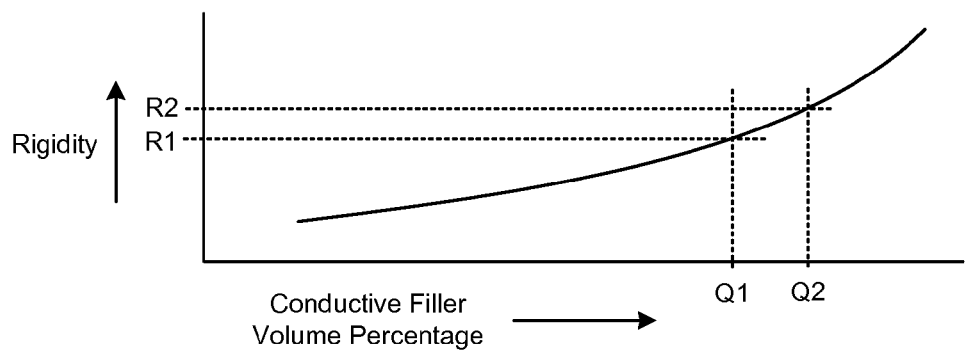
FIGS. 5A and 5B are diagrams that illustrate characteristics of sensing structures based on conductive filler volume percentage.
Figure 5B:
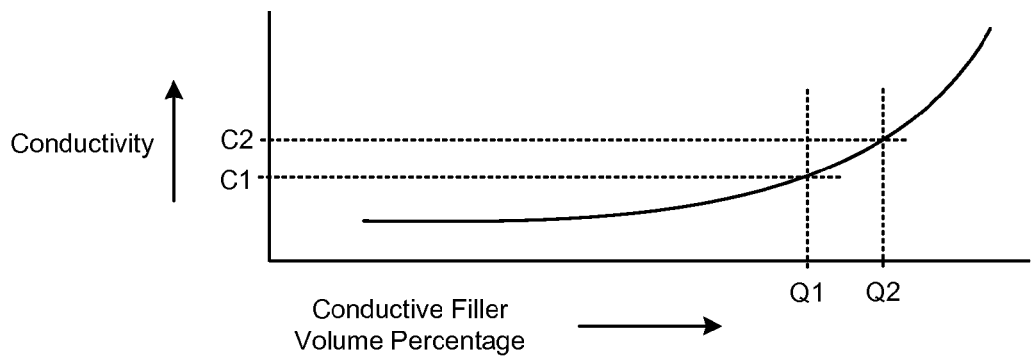

FIGS. 5A and 5B are diagrams that illustrate characteristics of sensing structures based on conductive filler volume percentage. Although illustrated as conductive filler volume percentage, similar relationships (or effects on mechanical properties such as rigidity or electrical properties such as conductivity) can be demonstrated based on conductive filler weight percentage, conductive filler density, and/or so forth.

As illustrated in FIG. 5A, a mechanical property (represented as rigidity in this graph) of the sensing structure changes (e.g., increases, decreases) with changes in conductive filler volume percentage. Specifically, the rigidity of the sensing structure increases (e.g., increases in a non-linear fashion) with changes in conductive filler volume percentage. For example, a sensing structure with a conductive filler volume percentage Q1 can have a rigidity R1 as shown in FIG. 5A. For comparison, a sensing structure with a conductive filler volume percentage Q2 (which is higher than Q1) can have a rigidity R2 (which is higher than R1) as shown in FIG. 5A. Other mechanical properties of a sensing structure that can be affected by changes in conductive filler volume percentage can include, for example, density of the sensing structure, elasticity of the sensing structure, and/or so forth.

As illustrated in FIG. 5B, an electrical property (represented as a conductivity in this graph) of the sensing structure changes (e.g., increases, decreases) with changes in conductive filler volume percentage. Specifically, the conductivity of the sensing structure increases (e.g., increases in a non-linear fashion) with changes in conductive filler volume percentage. For example, a sensing structure with a conductive filler volume percentage Q1 can have a rigidity C1 as shown in FIG. 5B. For comparison, a sensing structure with a conductive filler volume percentage Q2 (which is higher than Q1) can have a rigidity C2 (which is higher than C1) as shown in FIG. 5A.

Other electrically properties of a sensing structure that can be affected by changes in conductive filler volume percentage can include, for example, electrical responsiveness of the sensing structure, resistivity of the sensing structure, and/or so forth. For example, a sensing structure with a relatively high volume percentage of conductive fillers can have a relatively high responsiveness. Specifically, the sensing structure with the relatively high volume percentage of conductive fillers can change from a low conductive state (or low conductance) to a high conductive state (or high conductance) over a relatively small strain range (e.g., change between states in a logarithmic fashion or stepwise fashion). Such a sensing structure can have a switch-like behavior.

Conversely, a sensing structure with a relatively low volume percentage of conductive fillers can have a relatively low responsiveness. Specifically, the sensing structure with the relatively low volume percentage of conductive fillers can change gradually (e.g., in a linear fashion or close to linear fashion) from a low conductive state to a high conductive state over a relatively large strain range. Such a sensing structure can have a granular or gradual detection capability.

FIGS. 5A and 5B are illustrated by example only. Different types of relationships can exist between a conductive filler (and a quantity or characteristic thereof) included in a sensing structure and a mechanical and/or electrical property. For example, in some implementations, a sensing structure can be configured so that a rigidity (and/or a different mechanical property) of the sensing structure can change (e.g., increase, decrease) in a linear fashion, logarithmic fashion, a step-wise fashion, and/or so forth with respect to a change in a conductive filler (e.g., a change in a volume percentage of a conductive filler within the sensing structure). In some implementations, a sensing structure can be configured so that a conductivity (and/or a different electrical property) can change (e.g., increase, decrease) in a linear fashion, logarithmic fashion, a step-wise fashion, and/or so forth with respect to a change in a conductive filler (e.g., a change in a volume percentage of a conductive filler within the sensing structure).

In some implementations, a sensing structure can have a composition such that a change in a conductive filler (e.g., a change in a volume percentage of a conductive filler) may have little or no impact on an electrical property and/or a mechanical property of the sensing structure.

In some implementations, a sensing structure can be combined with a substrate in a composite fashion (as described above) to achieve specific mechanical and/or electrical properties. For example, a composition of a sensing structure can include a volume percentage of conductive fillers to achieve a desirable electrical response for a particular application. The sensing structure with the composition can, however, have mechanical properties that are defined by the volume percentage of the conductive fillers, which may not be desirable for the particular application. The sensing structure can be coupled to (e.g., integrated with) a substrate (e.g., object), so that when the sensing structure is combined with the substrate, the sensing structure and the substrate collectively have a desirable mechanical property (and desirable electrical property).

Figure 6:
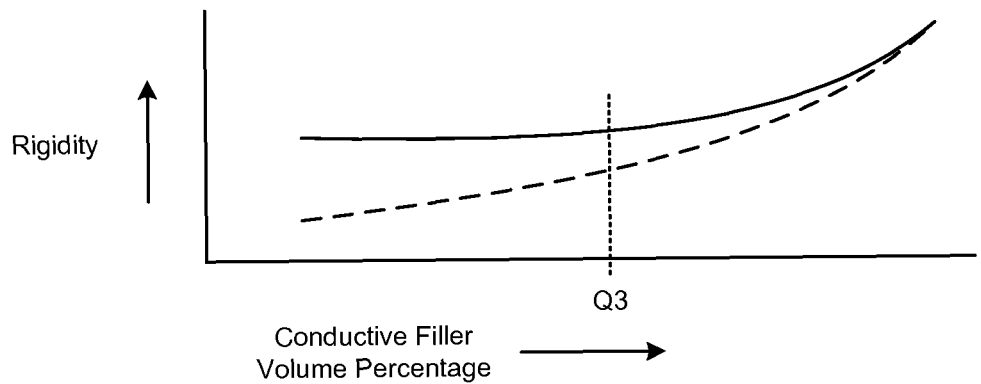
FIG. 6 is a diagram that illustrates a change in a mechanical property of a combination of a sensing structure and a substrate when the sensing structure is coupled to the substrate.

FIG. 6 is a diagram that illustrates a change in a mechanical property of a combination of a sensing structure and a substrate when the sensing structure is coupled to the substrate. In the graph illustrated in FIG. 6, the rigidity of the combination is generally greater at conductive filler volume percentages (e.g., composition with a conductive filler volume percentage at Q3) compared with the rigidity of the sensing structure below (illustrated by the dashed line and as illustrated in FIG. 5A). Despite the potential changes in composition, the electrically properties can be the same (e.g., the same as in FIG. 5B).

As a specific example, a sensing structure can be coupled to a tape or other type of adhesive (e.g., a tape made of a material including a polymer, an athletic tape). The tape can function as an adhesive that can be used in conjunction with the sensing structure so that the combination of the sensing structure and adhesive can be coupled to another object. In some implementations, the tape may be more flexible or less flexible than the sensing structure. The sensing structure can provide electrical properties that may be used in a desirable fashion in conjunction with the tape.

As another example, a sensing structure can be coupled to a fabric. The fabric can be integrated into, for example, clothing. The sensing structure can provide electrical properties that may be used in a desirable fashion in conjunction with the fabric.

As yet another example, a sensing structure can be coupled to an elastic. In some implementations, the elastic can be used around, for example, a joint (e.g., a hinge, a human joint). The sensing structure can provide electrical properties that may be used in a desirable fashion in conjunction with the elastic.

As another example, a sensing structure can be coupled to a metal (e.g., a flexible metal, nitinol). In some implementations, the metal can be used as a conductor (e.g., a conductor of the sensing structure). The sensing structure can provide electrical properties that may be used in a desirable fashion in conjunction with the metal.

In some implementations, the sensing structure can be coupled to a substrate (e.g., any of the substrates described herein) using a variety of coupling mechanisms. For example, the sensing structure can be coupled using one or more threads (e.g., a sewn thread), adhesives (e.g., a glue, a tape, an epoxy), screws, press-fit mechanisms, clips, hooks, wires, pins, staples, hinges, and/or so forth.

In some implementations, coupling of the sensing structure to a substrate via a coupling mechanism can affect one or more electrical properties of the sensing structure. For example, a glue that has some conductive properties can enhance conductivity of the combination of the sensing structure and the substrate. Specifically, the glue, as a coupling mechanism, can provide some conductivity that can be used by the sensing structure that can affect the overall electrical properties of the combination of the sensing structure and substrate. As another example, a coupling mechanism that is used to couple a sensing structure with a substrate can penetrate into the sensing structure and can disrupt (e.g., intentionally disrupt, can cause a resistance within a region or at a location) or can enhance (e.g., intentionally enhance, can cause conductivity within a region or at a location) electrical signaling within the sensing structure. As a specific example, a conductive staple that has at least a portion disposed within the sensing structure can provide enhanced conductivity within (e.g., can provide conductivity within one or more regions, can provide a conductivity bridge across) the sensing structure that can be used by the sensing structure during deformation to detect one or more locations of deformation. As another specific example, a non-conductive thread that has at least a portion disposed within the sensing structure can provide decreased conductivity (or resistivity) within (e.g., can provide resistivity within one or more regions) the sensing structure that can be used by the sensing structure during deformation to detect (or not detect) one or more locations of deformation.

In some implementations, a mechanism that penetrates into a sensing structure and that enhances or disrupts one or more electrical properties may not be used as a coupling mechanism. In some implementations, one or more coupling mechanisms can be used as (e.g., can function as) leads.

Referring back to FIG. 1, the sensing system 14 (or a portion thereof) can be integrated into (e.g., coupled to, attached to, embedded within, included in) a variety of objects (such as object 10) for a variety of applications. For example, the sensing system 14 (or portion thereof) can be integrated into a flexible surface, a rigid surface, and/or so forth. The sensing system 14 (or portion thereof) can be integrated into the object 10, for example, to detect a change in a physical property of the object 10.

As a few specific examples, the sensing system 14 (or a portion thereof) can be integrated into health monitors for tracking exercise. In some implementations, the sensing system 14 (or a portion thereof) can be integrated into (e.g., directly into) one or more portions of clothing (e.g., silicone-based clothing with embedded nickel nano particles). In some implementations, the sensing system 14 (or a portion thereof) can be integrated into one or more chair components for tracking characteristics of an occupant such as, for example, position and weight. In some implementations, the sensing system 14 (or a portion thereof) can be integrated into a one or more surfaces or components which can function as a keyboard or touch surface.

As yet additional examples, the sensing system 14 (or a portion thereof) can be integrated into a security system such as a tamper identification system. In some implementations, the sensing system 14 (or a portion thereof) can be integrated into one or more inflatable objects such as a tire to identify a bulge, etc. which can be indicative of a weak point, or an imminent blowout. In some implementations, the sensing system 14 (or a portion thereof) could be used identify one or more locations, sizes, etc. of these bulges so that they can be mitigated. In some implementations, the sensing system 14 (or a portion thereof) can be used in, or included within, a sensing fiber (e.g., a doped polyurethane fibers and doping the silicone coating applied to many fibers). In some implementations, the sensing system 14 (or a portion thereof) can be included into a skin such as an artificial skin. In some implementations, fibers can be embedded within a structure of the sensing system 14 for, for example, smart fabric applications (in contrast with a 1-D gauge).

Figure 7:
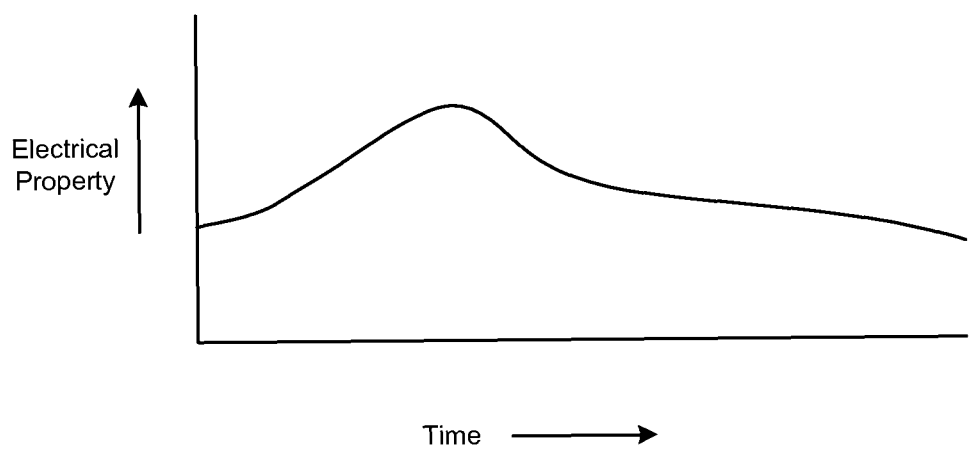
FIG. 7 is a diagram that illustrates time tracking of electrical property associated with a sensing structure.

FIG. 7 is a diagram that illustrates time tracking of electrical property associated with a sensing structure (e.g., sensing membrane 100 shown in FIG. 1, sensing structure 300 shown in FIG. 3). As shown in FIG. 7, a value of the electrical property is shown on the y-axis and time is shown on the x-axis. The time tracking of an electrical property can be associated with a pair of leads. In some implementations, time tracking can be associated with more than two leads. In some implementations, changes and or movement of a deformation can be identified using time tracking of one or more electrical properties. In some implementations, a composite map (e.g., two dimensional, three dimensional) of a sensing structure can be defined by time tracking one or more electrical properties. In some implementations, time tracking of, for example, piezoresistive changes can be used to identify distinct types of motions associated with an object. For example, time tracking can be used to identify one or more different types of stretch patterns corresponding to each type of exercise if a sensing structure is incorporated into a shoe insole. As another example, time tracking using a sensing structure can be used to identify of a fetal kick versus motion of the mother versus labor contraction. As yet another example, time tracking can be used to identify different levels of stretch in each knuckle corresponding to a unique mechanical signal that can be interpreted by a computer as an input (e.g., a letter or a word, an input to a computer game to move a direction, speed, jump, weapon change, etc).

Figure 8:
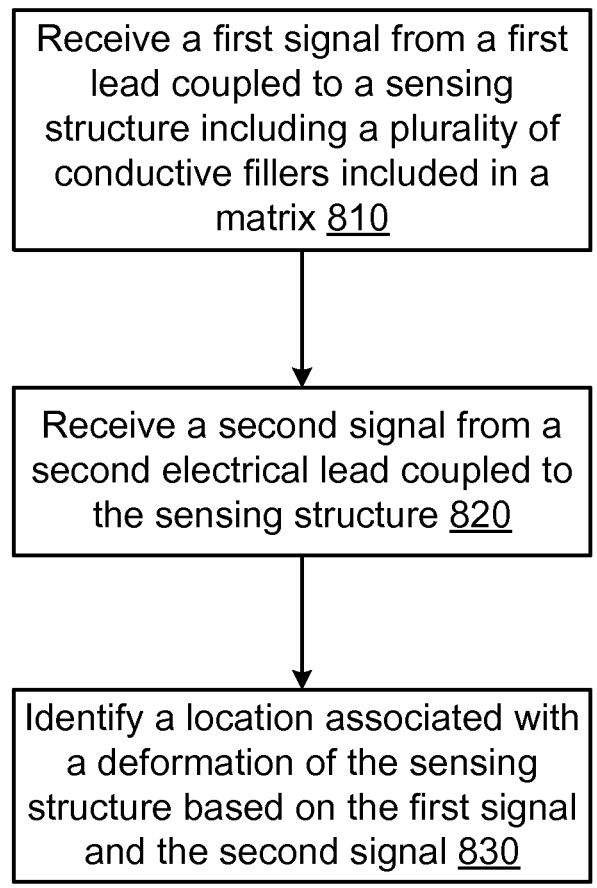
FIG. 8 is a flowchart that illustrates a method of identifying a location of a deformation.

FIG. 8 is a flowchart that illustrates a method of identifying a location of a deformation. The method described in connection with FIG. 8 can be applied to any of the sensing structures (e.g., sensing membranes) described above. At least some portions of the method can be performed at a computing device (e.g., computing device 12 shown and described in connection with FIG. 1).

As shown in FIG. 8, the flowchart includes receiving a first signal from a first lead (e.g., electrical lead) coupled to a sensing structure including a plurality of conductive fillers included in a matrix (at block 810). In some implementations, the sensing structure can be a sensing membrane. In some implementations, the first signal can be produced in response to a deformation.

The method can also include receiving a second signal from a second lead coupled to the sensing structure (at block 820). In some implementations, the first lead (or a different lead) can function as a reference lead with respect to the second lead. In some implementations, the second signal can be produced in response to a deformation.

The method can also include identifying a location associated with a deformation of the sensing structure based on the first signal and the second signal (at block 830). In some implementations, the identifying the location can include identifying the location within a surface area of a sensing membrane associated a deformation of the sensing membrane at the location based on the first signal and the second signal.

It will also be understood that when an element, such as a layer, a region, or a substrate, is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element or layer, there are no intervening elements or layers present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

As used in this description, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a sensing structure including a plurality of conductive fillers included in a matrix; and
a plurality of electrical leads coupled to a portion of the sensing structure, the conductive fillers having a volumetric percentage of less than 25% of a volume of the sensing structure.

2. The apparatus of claim 1, further comprising:
a substrate;
the sensing structure being coupled to the substrate such that a combination of the substrate and the sensing structure has a mechanical property that is different than a mechanical property of the sensing structure alone without modifying an electrical property of the sensing structure.

3. The apparatus of claim 1, wherein the portion can include an outer portion of the sensing structure.

4. The apparatus of claim 1, wherein the plurality of electrical leads includes an even number of electrical leads or an odd number of electrical leads.

5. The apparatus of claim 1, wherein the plurality of electrical leads includes at least three electrical leads.

6. The apparatus of claim 1, wherein the sensing structure has a piezoresistive effect.

7. The apparatus of claim 1, further comprising:
a computing device configured to identify at least one of a value of an electrical property or a location of a deformation of the sensing structure via the plurality of electrical leads.

8. The apparatus of claim 7, wherein the location includes a coordinate location.

9. The apparatus of claim 1, wherein the sensing structure includes a sensing membrane.

10. The apparatus of claim 1, wherein the conductive fillers include conductive nanoparticles, the matrix includes an insulating material.

11. An apparatus, comprising:
a sensing structure including a plurality of conductive fillers included in a matrix; and
a plurality of electrical leads coupled to a portion of the sensing structure, the sensing structure having a negative piezoresistive effect, the conductive fillers having a volumetric percentage of less than 25% of a volume of the sensing structure.

12. The apparatus of claim 11, further comprising:
a substrate;
the sensing structure being coupled to the substrate such that a combination of the substrate and the sensing structure has a mechanical property that is different than a mechanical property of the sensing structure alone without modifying an electrical property of the sensing structure.

13. The apparatus of claim 11, wherein the sensing structure includes a sensing membrane.

14. The apparatus of claim 11, further comprising:
a computing device configured to identify a location of a deformation of the sensing structure via the plurality of electrical leads.

15. An apparatus, comprising:
a sensing membrane including a plurality of conductive fillers included in a matrix; and
a plurality of electrical leads coupled to a portion of the sensing membrane, the sensing membrane having a thickness less than a width of the sensing membrane, the conductive fillers having a volumetric percentage of less than 25% of a volume of the sensing membrane.

16. The apparatus of claim 15, wherein the thickness of the sensing membrane is sufficiently thin to avoid Poisson effects.

17. The apparatus of claim 15, wherein the portion can include an outer portion of the sensing membrane.

18. The apparatus of claim 15, further comprising:
a computing device configured to identify at least one of a value of an electrical property or a location of a deformation of the sensing membrane via the plurality of electrical leads.

* * * * *